United States Patent [19]

Blüemel

[11] 4,263,186

[45] Apr. 21, 1981

[54] THERMOPLASTIC MATERIALS

[75] Inventor: Harald Blüemel, Marl, Fed. Rep. of Germany

[73] Assignee: Chemische Werke Huels Aktiengesellschaft, Marl, Fed. Rep. of Germany

[21] Appl. No.: 67,499

[22] Filed: Aug. 17, 1979

Related U.S. Application Data

[63] Continuation of Ser. No. 858,038, Dec. 6, 1977, abandoned.

[30] Foreign Application Priority Data

Dec. 17, 1976 [DE] Fed. Rep. of Germany ....... 2657273

[51] Int. Cl.³ .......................... C08K 3/22; C08K 3/26
[52] U.S. Cl. ........................ 260/23 H; 260/28.5 AS; 260/33.6 PQ; 260/42.45; 260/42.46; 260/45.75 F
[58] Field of Search ..................... 260/42.46, 28.5 AS, 260/33.6 PQ, 42.45, 23 H, 45.75 F

[56] References Cited

U.S. PATENT DOCUMENTS

| | | | |
|---|---|---|---|
| 3,351,495 | 11/1967 | Larsen | 260/42.46 |
| 3,440,208 | 3/1969 | Foglia | 260/42.46 |
| 3,511,802 | 5/1970 | Newland et al. | 260/45.75 F |
| 3,700,614 | 10/1972 | Schenkerberg | 260/42.46 |
| 3,900,442 | 8/1975 | Zannucci et al. | 260/45.75 NT |
| 3,963,647 | 6/1976 | Straub | 260/42.46 |
| 4,081,502 | 3/1978 | Blümel | 260/28.5 AS |

FOREIGN PATENT DOCUMENTS

| | | | |
|---|---|---|---|
| 1044503 | 10/1966 | United Kingdom | 260/42.46 |
| 1400145 | 7/1975 | United Kingdom | 260/42.46 |

Primary Examiner—James H. Derrington
Attorney, Agent, or Firm—Millen & White

[57] ABSTRACT

A lightly colored thermoplastic composition, suitable for fabrication into panels or sheets, and having high weatherability, comprises:
(a) 100 parts by weight of polyolefin elastomer;
(b) 15 to 130 parts by weight of crystalline or partially crystalline polyolefin;
(c) 30 to 240 parts by weight of chalk and/or siliceous chalk;
(d) 0.5 to 20 parts by weight of titanium dioxide; and, optionally,
(e) up to 40 parts by weight of bitumen and/or mineral oil; and
(f) up to 15 parts by weight of lubricant.

6 Claims, No Drawings

THERMOPLASTIC MATERIALS

This is a continuation of application Ser. No. 858,038, filed Dec. 6, 1977, now abandoned.

BACKGROUND OF THE INVENTION

This invention relates to light-colored, thermoplastic materials and their use in the manufacture of molded articles, especially panels or sheets, having a high weatherability.

It is known to utilize thermoplastic materials, for example, in the form of panels or sheets, for moisture seals. Such panels or sheets can be joined together to form rather large sealing surfaces either by heat welding or by use of solution welding agents such as swelling agents, or special adhesives. Alternatively, they can also be loosely laid on substrates such as concrete, wood, bitumen, and thermal insulating materials containing entrapped air; or they can be glued to such supporting materials at a few selected locations or over their entire surface area with the use of special large-surface area adhesives.

Important characteristics of the panels or sheets produced from the thermoplastic materials include suitable rheological properties, satisfactory weldability, and adequate mechanical properties over a rather wide range of temperatures. In addition, they must also exhibit, above all, a satisfactory resistance to weathering and to other environmental influences. At the high temperatures which can occur, for example, on flat roofs during the height of the summer in Central Europe or in countries having a tropical or subtropical climate, special demands are posed with regard to mechanical characteristics at these elevated temperatures on the one hand, and with respect to weatherability, on the other.

Thermoplastic materials based on carbon-black-containing compounds in most cases are extraordinarily weather-resistant, but, of course, are black. On the other hand, light-colored covering materials, due to their more favorable heat absorption and reflection properties, offer the possibility of keeping bulk temperatures substantially lower than is feasible for black-colored sheets or panels, e.g., by minimizing the effect of increased solar radiation. Also, more attractive optical-architectural effects can be achieved, including the introduction of aesthetically enhancing colors by the addition of colored pigments.

Even in underground construction technology, light-colored panels or sheets offer advantages, e.g., in making repairs, due to the fact that they can be more readily recognized as compared to black-colored panels or sheets.

A prerequisite for the use of such light colored materials is sufficient weatherability; however, this property is substantially poorer in light-colored thermoplastic materials than in black, carbon-containing ones. In most cases, the weatherability is so poor that the practical use of light colored materials is prohibited due to the short lifetime of the sealing sheets produced therefrom.

SUMMARY OF THE INVENTION

Accordingly, it is an object of this invention to provide light-colored thermoplastic materials which do not exhibit the aforedescribed disadvantages, or which display such disadvantages to a much lesser extent, i.e., which have a high weatherability.

This, and other objects of this invention which will hereinafter become clear, have been attained by providing thermoplastic materials which comprise:
(a) 100 parts by weight of polyolefin elastomer;
(b) 15 to 130 parts by weight of crystalline or partially crystalline polyolefin;
(c) 30 to 240 parts by weight of chalk and/or siliceous chalk;
(d) 0.5 to 20 by weight of titanium dioxide; and, optionally,
(e) up to 40 parts by weight of bitumen and/or mineral oil; and
(f) up to 15 parts by weight of lubricant.

DETAILED DISCUSSION

The subject matter of this application is related to that of U.S. Applications Ser. Nos. 857,948 and 858,127, both filed on Dec. 6, 1977, the former now U.S. Pat. No. 4,148,780, and the latter abandoned and now continuation application Ser. No. 030,048, filed on Apr. 13, 1979.

The blend of an elastomer and a crystalline or partially crystalline polyolefin, per se, is known; however, the particular compositions of this application are new and display unexpectedly superior properties as described herein (J. R. Dunn, Technology of Reinforcement of Elastomers, "Blends of Elastomers and Thermoplastics—A Review", J1–J17, especially J12–J13).

Suitable polyolefin elastomers, which form the basis of the thermoplastic materials of this invention, include polymers obtainable from ethylene; one or more α-olefins of 3–8 carbon atoms, preferably, propylene; and, optionally, one or more multiple olefins; or mixtures thereof. The elastomers are prepared using so-called Ziegler-Natta catalysts, which can additionally contain activators and modifiers, in a solution or dispersion at temperatures of from $-30°$ to $+100°$ C., for instance according to the methods of DAS's [German Published Applications] Nos. 1,570,352; 1,595,442; and 1,720,450, as well as DOS [German Unexamined Laid-Open Application] No. 2,427,343.

As component (a), preferred elastomers are saturated polyolefin elastomers consisting of 15–90% by weight, preferably 30–75% by weight of ethylene and of 85–10% weight, preferably 70–25% by weight of propylene and/or butene-1; and unsaturated polyolefin elastomers consisting, in addition to ethylene and propylene or butene-1, in the above relative proportions, of a $C_{4-12}$ multiple olefin in such an amount that the elastomers contain 0.5–30 double bonds per 1,000 carbon atoms. Especially preferred multiple olefins are cis- and trans-1,4-hexadiene, dicyclopentadiene, 5-methylene-, 5-ethylidene-, and 5-isopropylidene-2-norbornene.

Especially suitable polyolefins to be added to the composition of this invention in amounts of 15–130 parts by weight, preferably 20–100 parts by weight, include the crystalline and partially crystalline forms of polyethylene having densities of 0.910–0.975 g/cc, RSV values (measured at 135° C. in decahydronaphthalene) of 0.5–3.3 dl/g, and melt indices of 0.2–50 g/10 min. However, it is also possible to employ partially crystalline copolymers of ethylene with other α-olefins, the copolymers having the same properties. Suitable α-olefins are those having from 3 to 6 carbon atoms. Also suitable are crystalline and partially crystalline homo- and copolymers of propylene or butene-1, with these other α-olefins, preferably with ethylene, for example homo- and copolymers of propylene having densities of 0.90–0.910 g/cc, RSV values (measured at 135° C. in decahydronaphthalene) of 1.0–10 dl/g, and melt indices of 0.1–50 g/10 min; and homo- and copolymers of butene-1 with densities of 0.910–0.925 g/cc, RSV values (measured at 135° C. in decahydronaphthalene) of 1.0–10 dl/g, and melt indicies of 0.1–100 g/10 min. Mixtures of these polyolefins can also be used.

To improve the weldability of the molded articles produced from the materials of this invention, there can also be included, in addition to the crystalline or partially crystalline polyolefins, minor amounts (up to about one-third of the amount by weight of the crystalline or partially crystalline polyolefin, preferably up to 20% of this amount) of atactic polypropylene and/or polybutene-1 having a density of about 0.86 g/cc, and RSV values (measured at 135° C. in decahydronaphthalene) of 0.1–3.0 dl/g.

As fillers, the materials of this invention contain, first of all, 30–240 parts by weight, preferably 40–200 parts by weight, of chalk and/or siliceous chalk. Suitable such chalks include natural, ground pigments containing predominantly calcium carbonate or silicic acid, or precipitated calcium carbonate which can be coated, for example, with fatty acid derivatives, in the forms and manners conventional for rubber processing operations.

Other fillers conventional in thermoplastic compositions may also be included, such as, silicates, kaolin, talc, ground slate, etc. (see Boström, Kautschuk-Handbuch (1960), 2. Band, pages 242–274).

As an additional filler, 0.5–20 parts by weight, generally 3–15 parts by weight, preferably 5–10 parts by weight, of titanium dioxide is added thereto. Especially suitable is the rutile form of titanium dioxide.

Other optional ingredients for the composition of this invention are up to 40 parts by weight, generally 5–30 parts by weight, preferably 10–25 parts by weight, of bitumen or mineral oil; and up to 15 parts by weight, generally 0.5–12 parts by weight, preferably 3–10 parts by weight, of lubricant.

Suitable bitumens include liquid to solid distillation residues of the petroleum refinery process, consisting predominantly of highly condensed hydrocarbons, the structure of which can be partially altered, for example by oxidation ("blown bitumens") (Ulmanns Encyklopädie der technischen Chemie, 4. Band (1953), pages 400–446).

Suitable mineral oils include those having viscosities between 50 and 5,000 centistokes at 20° C., preferably between 200 and 3,000 centistokes at 20° C., and a density of 0.84–0.98 g/cc. Such oils can contain paraffinically as well as naphthenically or aromatically bound carbon atoms (see Boström, Kautschuk-Handbuch (1960), 2. Band, pages 290–293).

Suitable lubricants include, for example, fatty acids having 14 to 20 carbon atoms, such as stearic acid, salts of fatty acids, such as zinc stearate, or mixtures of fatty acids and/or fatty acid derivatives.

A particularly preferred composition consists essentially of elastomer, crystalline or partially crystalline polyolefin, chalk, siliceous chalk, mineral oil, titanium dioxide and lubricant.

The claimed thermoplastic materials can be manufactured, for example, using commercial internal mixers having a plunger and equipped with cooling means. The mixing step can optionally be conducted with heating. The mixing time periods generally required to achieve satisfactory homogenization are dependent upon the usual conventional considerations: for example, the recipe employed, the structure of the starting materials, the construction characteristics of the mixing unit and the subsequent processing steps employed, as well as the attendant conditions and devices selected. Such considerations include: bulk temperature (generally 50°–220° C., preferably 80°–150° C.); the extent to which the internal mixer is filled (generally to a degree of 1.0–1.8, preferably 1.2–1.5, based on the useful capacity of the mixer, which is only a part of the total available capacity); and rotor speeds (in general up to 100 r.p.m., preferably 10–40 r.p.m.) The resultant homogenization time periods are generally between 1 and 100 minutes, preferably about 35 minutes. After a sufficient degree of homogenization, the materials, the temperatures of which range normally between 50° and 220° C., are ejected.

The order of mixing of the ingredients is not critical and can be varied in accordance with conventional procedures.

In case of mixture compositions having higher concentrations of bitumen, it may be necessary to cool the material prior to ejection (cooling time 1–30 minutes, preferably 3–15 minutes), in order to avoid extensive adhesion to the mixer jacket and rotors, which can make the ejection practically impossible in some cases. (See related U.S. Pat. No. 4,081,502. The materials discharged from the internal mixer are then converted into endless strips or strands, for example, by pairs of rolls of screw-driven units, and are either granulated or directly passed on to the subsequent processing systems.

Suitable such processing systems, serving, for example, for the production of panels or sheets, include conventional calenders, extruders having slot dies, or so-called roller head units. These can also be equipped with devices for the application or incorporation of support materials, such as, for example, nonwoven mats of synthetic fibers and glass fabric. Panels or sheets can be of any conventional thickness or size; generally being from 0.5 to 4.0 mm thick.

The materials of this invention, which are distinguished by high weatherability, are particularly useful in building construction, especially in the form of panels or sheets. For example, they can be used in the sealing of buildings having flat roofs. They are also suitable for underground construction, for example, for the lining of collecting tanks, preliminary holding basins, settling tanks, and reservoirs, and for the supportive lining for ponds, canals, and artificial lakes. It is furthermore possible to utilize these panels or sheets as sealing sheets for cut-throughs, tunnels, and underpasses, as well as for bridge construction and high-rise seals in groundwater zones.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

In a laboratory kneader (Werner & Pfleiderer, type GK 2 with plunger), having a useful capacity of 2 liters, the ethylene-propylene diene elastomer described below and denoted by EPDM I (diene=ethylidene norbornene; 30% by weight of propylene; 8 double bonds/1,000 carbon atoms; $ML_{1+4}$ at 100° C.=87; polymer green strength=130 kp/cm$^2$) was mixed with the products set forth below using the indicated mixing times at an initial kneader temperature of 90° C. and a rotor speed of 50 r.p.m.

| Mixing Step | | | Time (Minutes) |
|---|---|---|---|
| Introduction of | 1,078 g | EPDM I | 0 |
| Introduction of | 216 g | mineral oil | |
| Introduction of | 862 g | siliceous chalk | 1 |
| Introduction of | 216 g | polyethylene | |
| (density 0.935 g/cc, melt index 0.5 g/10 min.) | | | 3 |
| Introduction of | 432 g | chalk | |
| Introduction of | 54 g | titanium dioxide pigment | |
| Introduction of | 107 g | lubricant | |
| Cleaning of plunger | | | 4 |
| Ejection | | | 9 |

The homogeneous mass was ejected at a batch temperature of 160° C. and subsequently made into a sheet on a laboratory rolling mill at a surface temperature of 50° C. This sheet was cut into strips or granulated.

The strips or the granulated material was molded into 1 mm thick sheets in a Kleinewefers laboratory extruder having a 300 mm wide slot die attached in front, followed by a 2-roll smoothing calender. Test specimens were taken therefrom. Using a "Xenotest Device 150", these withstood a period of weathering of 3,500 hours without any visible surface change.

EXAMPLE 2

Under the same conditions as described in Example 1, the following mixture components were combined in the indicated time periods and amounts to form a thermoplastic mass:

| Mixing Step | | | Time (Minutes) |
|---|---|---|---|
| Introduction of | 1,076 g | EPDM I | 0 |
| Introduction of | 284 g | bitumen B 80 | |
| Introduction of | 1,361 g | chalk | |
| Introduction of | 454 g | siliceous chalk | 1 |
| Introduction of | 340 g | polypropylene | |
| (density 0.909 g/cc, melt index 2.0 g, 10 min.) | | | |
| Introduction of pigment | 113 g | titanium dioxide | 3 |
| Cleaning of plunger | | | 4 |
| Ejection | | | 9 |

The ejection temperature of the material was 170° C. The sheets were manufactured and tested in accordance with the conditions set forth in Example 1. After the exposure of about 3,500 hours, no substantial surface change was observed except for a slight chalk bloom on the surface. Because of this separation of chalk, the surface of the thermoplastic material, originally of a slightly brownish color due to the bitumen, became substantially lightened.

EXAMPLE 3

Under the conditions set forth in Example 1, a thermoplastic material was produced from the components set forth below and within the indicated time periods:

| Mixing Step | | | Time (Minutes) |
|---|---|---|---|
| Introduction of | 861 g | EPDM I | 0 |
| Introduction of | 345 g | chalk | |
| Introduction of | 790 g | siliceous chalk | |
| Introduction of | 172 g | mineral oil | 1 |
| Introduction of | 430 g | polyethylene | |
| (density 0.935 g/cc, melt index 0.5 g/10 min.) | | | 3 |
| Introduction of | 43 g | titanium dioxide pigment | |
| Introduction of | 86 g | lubricant | |
| Cleaning of plunger | | | 4 |
| Ejection | | | 9 |

The batch, ejected at 155° C., was shaped into sheets according to Example 1, from which test specimens were placed into a "Xenotest Device 150" and examined. After an exposure time of 3,500 hours, no surface changes could be detected.

EXAMPLE 4

Under the same conditions as set forth in connection with Example 1, the following mixture components were combined into a thermoplastic material within the indicated time periods and with the indicated quantities:

| Mixing Step | | | Time (Minutes) |
|---|---|---|---|
| Introduction of | 545 g | EPDM I | 0 |
| Introduction of | 94 g | mineral oil | |
| Introduction of | 218 g | chalk | 1 |
| Introduction of | 436 g | siliceous chalk | |
| Introduction of | 545 g | polyethylene | |
| (density 0.935 g/cc, melt index 0.5 g/10 min.) | | | 3 |
| Introduction of | 24 g | titanium dioxide pigment | |
| Introduction of | 48 g | lubricant | |
| Cleaning of plunger | | | 4 |
| Ejection | | | 9 |

The batch, ejected at 153° C. was shaped into test specimens analogously to Example 3 and exposed to light. Even after 3,500 hours of exposure, no surface changes were detectable.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A thermoplastic material which comprises:
   (a) 100 parts by weight of polyolefin elastomer;
   (b) 15–100 parts by weight of a crystalline or partially crystalline polyolefin;
   (c) 30–240 parts by weight of chalk, siliceous chalk, or a mixture thereof; and
   (d) 0.5–20 parts by weight of titanium dioxide, and which is light colored, and
wherein the polyolefin elastomer is a saturated elastomer consisting of 15–90% of ethylene and 85–10% of propylene, butene-1 or mixtures thereof; or an unsaturated elastomer consisting of ethylene in combination with propylene, butene-1 or mixtures thereof, in a ratio of from 15/85 to 90/10, respectively, and an amount of a multiple olefin sufficient to provide from 0.5 to 30 double bonds per 1000 carbon atoms of the elastomer; and wherein the crystalline or partially crystalline polyolefin is polyethylene or a copolymer thereof with an α-olefin having a density of 0.910–0.975 g/cc, an RSV value of 0.5–3.3 dl/g and a melt index of 0.2–50 g/10 min; a homo- or copolymer, wit an α-olefin, or propylene having a density of 0.90–0.910 g/cc, an RSV value of 1.0–10 dl/g and a melt index of 0.1–50 g/10 min; or a homo- or copolymer, with an α-olefin of butene-1 having a density of 0.910–0.925 g/cc, an RSV value of 1.0–10 dl/g and a melt index of 0.1–100 g/10 min.

2. The thermoplastic material of claim 1 which further comprises up to about ⅓ of the amount by weight of the crystalline or partially crystalline polyolefin of atactic polypropylene, polybutene-1 or a mixture thereof.

3. The thermoplastic material of claim 1 which further comprises:
 (e) up to 40 parts by weight of bitumen, mineral oil or a mixture thereof; and
 (f) up to 15 parts by weight of lubricant.

4. A sheet or panel composed of the thermoplastic material of claim 1.

5. The composition of claim 3, which consits essentially of elastomer, crystalline or partially crystalline polyolefin, chalk, siliceous chalk, bitumen, mineral oil, titanium dioxide and lubricant.

6. The composition of claim 1 wherein the amount of component (b) is 20–100 wt. parts.

* * * * *